United States Patent [19]

Sutherland

[11] 3,998,756
[45] Dec. 21, 1976

[54] PREPARATION OF ACTIVATED CARBONACEOUS MATERIAL FROM SEWAGE SLUDGE AND SULFURIC ACID

[75] Inventor: Gordon Sutherland, Wilmington, Del.

[73] Assignee: Hercules Incorporated, Wilmington, Del.

[22] Filed: June 17, 1974

[21] Appl. No.: 480,200

[52] U.S. Cl. .............................. 252/422; 201/25; 210/6; 210/40; 423/449
[51] Int. Cl.² ................... B01J 37/00; B01J 21/18
[58] Field of Search .......... 252/422, 447; 423/449, 423/445; 201/2.5, 25

[56] References Cited
UNITED STATES PATENTS

| | | | |
|---|---|---|---|
| 1,251,546 | 1/1918 | Lyon et al. | 252/422 |
| 2,171,408 | 8/1939 | Smit | 252/422 |
| 2,191,063 | 2/1940 | Smit | 252/422 |
| 2,245,579 | 6/1941 | Davis | 252/422 |
| 3,619,420 | 11/1971 | Kemmer et al. | 252/422 |
| 3,637,487 | 1/1972 | Kemmer et al. | 252/423 |
| 3,640,820 | 2/1972 | Kemmer et al. | 252/422 |
| 3,776,856 | 12/1973 | Scheffler et al. | 252/422 |

Primary Examiner—Winston A. Douglas
Assistant Examiner—P. E. Konopka
Attorney, Agent, or Firm—Michael B. Keehan; Edith A. Rice

[57] ABSTRACT

This invention relates to a process of preparing activated carbonaceous material from sewage sludge by treating the sludge with sulfuric acid and then subjecting the mixture to elevated temperatures of about 150° to about 350° C. The activated material can be used as an adsorbent in any of the conventional processes employing powdered activated carbon, for example, waste water treatment.

4 Claims, No Drawings

PREPARATION OF ACTIVATED CARBONACEOUS MATERIAL FROM SEWAGE SLUDGE AND SULFURIC ACID

This invention relates to the preparation of activated carbonaceous material and in particular to the preparation of activated carbonaceous material from sewage sludge solids.

For environmental and ecological reasons, the innocuous dispoal of sewage sludge from sewage treatment plants has become increasingly important. Many suggestions have been made to convert sewage sludge from potential pollutants into useful products. One proposed solution to the problem is described in U.S. Pat. Nos. 3,619,420, 3,637,847 and 3,640,820. In these patents sewage sludge is heated at 300°–900° C. in a controlled atmosphere in the presence of a conditioning agent to form an activated substance. The conditioning agents used are hydrochloric acid, an acidic phosphorus compound, and an acidic carbonate compound, respectively. The activated substance is returned to the sewage system to remove dissolved organic contaminants.

Now, in accordance with this invention, an improved process has been discovered for converting sewage sludge solids into activated carbonaceous material by treatment of sewage sludge with sulfuric acid at temperatures below 350° C. without the need for a controlled atmosphere. Accordingly, this invention relates to a process for preparing activated carbonaceous material which comprises:

a. adding sulfuric acid to sewage sludge in an amount of at least 50% by weight, based on the dry weight of the sewage sludge solids; and b. heating the resulting mixture at a temperature of from about 150° C. to about 350° C. until an activated carbonaceous material is produced.

Sewage sludge is a concentrated aqueous suspension of organic and inorganic solids removed from the raw sewage during the sewage treatment process. Sewage sludge used in the practice of this invention can be that obtained by any of the conventional methods of treating sewage. For example, sludge obtained from either physical-chemical or biological sewage systems can be employed. The sewage sludge can be dried before the addition of sulfuric acid or it can be used in its wet state.

Sulfuric acid is added to the sludge in an amount of at least 50% by weight, based on the dry weight of the sewage sludge solids. It is preferred, but not necessary, to employ concentrated sulfuric acid. Since any water present in the system is driven off when the sewage sludge-sulfuric acid mixture is heated, the use of concentrated sulfuric acid avoids introducing unnecessary water into the system. Any amount of sulfuric acid above about 50% by weight, based on the dry weight of the sewage sludge solids, can be employed in the process of this invention. However, the addition of sulfuric acid in an amount greater than the dry weight of the sewage sludge solids does not increase the yield or improve the adsorption characteristics of the activated carbonaceous material produced. Thus, for economic reasons, it is preferred to use from about 50% to about 100% by weight, based on the dry weight of the sewage sludge solids, of sulfuric acid.

The mixture of sewage sludge and sulfuric acid is heated at temperatures of from about 150° to about 350° C., and preferably of from about 250° to about 300° C. to carbonize the organic content of the sewage sludge to produce the activated carbonaceous material. At temperatures below about 150° C. carbonization of the sewage sludge does not take place. At temperatures above about 350° C., the carbonaceous material oxidizes, or burns off, due to reaction with the air in the surrounding atmosphere. The sewage sludge-sulfuric acid mixture can be heated to carbonization temperatures immediately after the addition of sulfuric acid to the sludge. However, if desired, the mixture can be dried by heating to a temperature of about 100° to about 120° C. to drive off the water prior to heating the mixture to carbonization temperatures.

In the process of this invention, heating of the sewage sludge and sulfuric acid is continued until an activated carbonaceous material is produced. The amount of time required varies with the amount of sewage sludge treated. In general, the entire mass of sewage sludge and sulfuric acid must be brought to a temperature of from about 150° to about 350° C. and maintained at this temperature for at least about 15 minutes to produce an activated carbonaceous material.

The activated carbonaceous material produced by the process of this invention is in powdered form and is a highly effective adsorbent. It can be used in any of the conventional processes employing powdered activated carbon, for example, waste water treatment, clarification of sugar, solvent recovery, such as in dry cleaning operations, processing chemicals and many others.

The activated carbonaceous material contains soluble sulfates formed by reaction between inorganic components of the sludge and sulfuric acid during heating. The presence of these sulfates does not interfere with the adsorption capacity of the carbonaceous material produced and they do not need to be removed. However, if desired, they can be removed by extraction with water.

When ferric chloride has been used as a coagulant in the sewage treatment process, as is frequently done in physical-chemical sewage processes, the sludge will also contain insoluble iron salts. These salts can be removed by extraction with a mineral acid, such as hydrochloric acid, and can be recovered for reuse. If these iron salts are not removed, before the sludge is heated in accordance with this invention, they are converted into magnetic iron oxide which imparts its magnetic properties to the activated carbonaceous material. The magnetic activated carbonaceous material has the added advantage of being capable of separation by magnetic means from a solution to which it has been added as an adsorbent in a clarification process.

The following examples illustrate the process of this invention. In these examples all parts and percentages are by weight, unless otherwise specified.

EXAMPLE 1

To 32 parts of dried sewage sludge solids obtained by physical-chemical treatment of sewage is added 32 parts of concentrated sulfuric acid (98%) which has been diluted with distilled water. The distilled water is added to moderate the heat generated during the addition of sulfuric acid to sewage sludge. This mixture is heated to dryness at 110 C. and yields 55 parts of a black tacky powder residue. This residue is heated at 250° C. for 1 ½ hours and yields 47 parts of a dry powder. The dry powder is extracted with six 100 part portions of water to remove any unreacted acid plus any soluble salts and then dried. The resulting 14 parts of powdered material is magnetic and is shown to be activated carbonaceous material by the following test procedures.

a. Carbon Content: To determine the amount of carbon in the material, a sample is placed in an oven and heated to 700° C. to burn off the carbonaceous material. The amount of carbon is 58.6% of the material.

b. Adsorption Capacity: An amount of 0.5 parts of the activated carbonaceous material produced in this example is compared with an equal amount of a commercial water treatment grade activated carbon in an adsorption capacity test. The activated carbonaceous material and the commercial activated carbon are each added to 200 parts of untreated sewage which has been filtered to remove large particles. Each sewage sample is agitated for about one hour and the carbon with adsorbed contaminants is removed by filtration. The filtrate is analyzed to determine its total oxygen demand (TOD). The TOD of each treated sewage sample is compared to the TOD of untreated sewage (Table I). The carbon content of the organic contaminants remaining in the treated sewage is compared to that of untreated sewage (Table I). These date show that the activated carbonaceous material prepared in this example has good adsorptive capacity and compares favorably with commercial activated carbon as to adsorptive capacity.

TABLE I

| Sewage Sample | TOD (mg/l) | Carbon Content of Sewage (mg/l) |
| --- | --- | --- |
| Untreated | 163 | 47 |
| Treated with Material prepared in Ex. 1 | 82 | 16 |
| Treated with Commercial Carbon | 83 | 22 |

EXAMPLE 2

A sample of wet sewage sludge, i.e., about 10% by weight solids, obtained by physical-chemical treatment of sewage, is treated with an equal weight, based on the dry weight of the sewage sludge solids, of undiluted concentrated sulfuric acid. This mixture is placed directly into a 250° C. oven and heated for 4 hours. The material is water extracted, as in Example 1, and dried. Adsorption capacity tests, as in Example 1, showed this material to be active in the same order of magnitude as the material prepared from sewage in Example 1.

EXAMPLE 3

A sample of wet biological sludge, i.e., about 3% by weight solids, is treated with an equal weight, based on the dry weight of the sewage sludge solids, of undiluted sulfuric acid, dried at 110° and then heated at 250° C. for 4 hours. The resulting material is extracted with water, and then tested for adsorptive capacity as in Example 1. This material also shows a significant adsorptive capacity for sewage.

EXAMPLE 4

A 200 part sample of undried physical-chemical sewage sludge containing about 12% by weight of solids is treated with 25 parts concentrated sulfuric acid, i.e., about 100% by weight, based on the dry weight of the sewage sludge solids. The mixture is dried at 110° C. and then heated at 250° C. for 1 hour. The resulting material is extracted with water. The extracted material contains 4.8 parts of solids removeable by incineration, i.e., carbon.

A similar sludge sample is treated with 12.5 parts concentrated sulfuric acid, i.e., about 50% by weight based on the dry weight of the sewage sludge solids, dried at 110° C. and then heated at 250° C. for ½ hour. The material is extracted with water. The extracted material contains 2.1 parts of carbon. In each case the material produced has significant adsorptive capacity for sewage, when tested as in Example 1 before incineration. These results show that as the weight ratio of sulfuric acid to sludge solids decreases, the amount of activated carbonaceous material produced decreases.

EXAMPLE 5

A sample of physical-chemical sewage sludge is treated with an equal weight, based on the dry weight of the sewage sludge solids, of sulfuric acid and heated to dryness in a 110° C. oven. Samples of the residue are then heated at various temperatures in a furnace for ½ hour. The relative percent combustible material, i.e., carbonaceous material, remaining after treatment at each temperature, compared to that of the residue before such heating, is given in Table II. The results show that burn-off, or oxidation, of the carbonaceous material becomes extensive above 350° C.

TABLE II

| Treatment Temperature, ° C. | % Combustible Remaining |
| --- | --- |
| 100 | 100 |
| 200 | 40.7 |
| 250 | 34.4 |
| 300 | 31.3 |
| 350 | 15.6 |
| 400 | 6.3 |
| 500 | 0 |

EXAMPLE 6

A sample of physical-chemical sewage sludge is treated with an equal weight of sulfuric acid, based on the dry weight of the sewage sludge solids. This mixture is heated to dryness in a 100° C. oven. Samples of the resulting black residue are heated at 150°, 175°, 200°, 250°, and 300° C. until there is no longer any visible emission of volatiles. Each of the materials produced is extracted with 50% hydrochloric acid to remove iron salts, washed three times with water and then dried. Adsorption capacity tests are then run, as in Example 1, using filtered raw sewage. The percent TOD removal for each material (identified by treatment temperature) is given in Table III. These results show that temperatures above 150° C. can be used, that a superior product results when the residue is heated at 250° C. and that adsorption capacity decreases when the residue is heated above 250° C.

TABLE III

| Treatment Temperature, ° C. | % TOD Removal |
| --- | --- |
| 150 | 0 |
| 175 | 30 |
| 200 | 32 |
| 250 | 59 |
| 300 | 37 |

What I claim and desire to be protected by Letters Patent is:

1. The process for preparing activated carbonaceous material which comprises:
   a. adding sulfuric acid to sewage sludge containing at least 3% by weight of solids, in an amount of at least about 50% by weight, based on the dry weight of the sewage sludge solids; and
   b. heating the resulting mixture in the presence of air at a temperature of from about 150° to about 350° C. a powdered carbonaceous material is produced.

2. The process of claim 1 in which the amount of sulfuric acid is 100% by weight, based on the dry weight of the sewage sludge solids.

3. The process of claim 1 in which the temperature of the heating step is from about 250° to about 300° C.

4. The process for preparing activated carbonaceous material which comprises:
   a. adding sulfuric acid to sewage sludge containing at least 3% by weight of solids, in an amount of at least about 50% by weight, based on the dry weight of the sewage sludge solids;
   b. heating the resulting mixture at a temperature of from about 100° C. to about 120° C. to drive off the water from said mixture; and
   c. heating the dried mixture in the presence of air at a temperature from about 150° C. to about 350° C. until a powdered carbonaceous material is produced.

* * * * *

UNITED STATES PATENT AND TRADEMARK OFFICE
CERTIFICATE OF CORRECTION

PATENT NO. : 3,998,756
DATED : December 21, 1976
INVENTOR(S) : Gordon Sutherland It is certified that error appears in the above—identified patent and that said Letters Patent are hereby corrected as shown below:

In the Claims, Claim 1, lines 8 & 9
after " 350° C. " insert -- until --.

Signed and Sealed this

First Day of March 1977

[SEAL]

Attest:

RUTH C. MASON
Attesting Officer

C. MARSHALL DANN
Commissioner of Patents and Trademarks